(12) United States Patent
Inoue et al.

(10) Patent No.: US 11,539,064 B2
(45) Date of Patent: Dec. 27, 2022

(54) POLYMER ELECTROLYTE MEMBRANE AND METHOD FOR PRODUCING THE SAME

(71) Applicant: ASAHI KASEI KABUSHIKI KAISHA, Tokyo (JP)

(72) Inventors: Yuichi Inoue, Tokyo (JP); Takumi Ishii, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 370 days.

(21) Appl. No.: 16/330,633

(22) PCT Filed: Sep. 7, 2017

(86) PCT No.: PCT/JP2017/032367
§ 371 (c)(1),
(2) Date: Mar. 5, 2019

(87) PCT Pub. No.: WO2018/047925
PCT Pub. Date: Mar. 15, 2018

(65) Prior Publication Data
US 2020/0203746 A1    Jun. 25, 2020

(30) Foreign Application Priority Data
Sep. 8, 2016  (JP) .............................. JP2016-175772

(51) Int. Cl.
| | | |
|---|---|---|
| *H01M 8/1044* | (2016.01) | |
| *H01M 8/1004* | (2016.01) | |
| *H01M 8/1039* | (2016.01) | |
| *H01M 8/1081* | (2016.01) | |
| *H01M 8/18* | (2006.01) | |
| *H01M 8/10* | (2016.01) | |

(52) U.S. Cl.
CPC ....... *H01M 8/1044* (2013.01); *H01M 8/1004* (2013.01); *H01M 8/1039* (2013.01); *H01M 8/1081* (2013.01); *H01M 8/188* (2013.01); *H01M 2008/1095* (2013.01); *H01M 2300/0082* (2013.01)

(58) Field of Classification Search
CPC ............ B01D 2325/14; B01D 2325/24; B01D 67/0083; B01D 69/02; B01D 71/32; B01D 71/82; C08J 2327/18; C08J 5/2225; C08J 5/225; C25B 13/08; H01B 1/122; H01M 2008/1095; H01M 2300/0082; H01M 2300/0091; H01M 8/1004; H01M 8/1039; H01M 8/1044; H01M 8/1067; H01M 8/1081; H01M 8/188; Y02E 60/50; Y02P 70/50
See application file for complete search history.

(56) References Cited

U.S. PATENT DOCUMENTS

| | | | |
|---|---|---|---|
| 7,285,349 B2 | 10/2007 | Hamrock et al. | |
| 9,799,906 B2 | 10/2017 | Miyake et al. | |
| 2004/0097603 A1 | 5/2004 | Hasegawa et al. | |
| 2005/0095487 A1 | 5/2005 | Hamrock et al. | |
| 2005/0130006 A1 | 6/2005 | Hoshi et al. | |
| 2010/0297523 A1 | 11/2010 | Merlo et al. | |
| 2011/0183231 A1* | 7/2011 | Park ...................... | H01M 4/921 429/480 |
| 2014/0349160 A1* | 11/2014 | Kato ................... | H01M 8/1023 429/105 |
| 2014/0377687 A1 | 12/2014 | Miyake et al. | |

FOREIGN PATENT DOCUMENTS

| | | |
|---|---|---|
| EP | 1455408 A1 | 9/2004 |
| EP | 2800191 A | 11/2014 |
| JP | 2000-149965 A | 5/2000 |
| JP | 2002-124272 | 4/2002 |
| JP | 2004-107461 | 4/2004 |
| JP | 2007-511047 | 4/2007 |
| JP | 2009/238515 | 10/2009 |
| JP | 2011/505444 | 2/2011 |
| WO | 2000/079629 A1 | 12/2000 |
| WO | 2002/062879 | 8/2002 |
| WO | 2005/029624 | 3/2005 |
| WO | 2013/100079 | 7/2013 |
| WO | 2014/098910 A | 6/2014 |

OTHER PUBLICATIONS

Ahmed, M. E. I, et al. "Nafion-117 Behavior during Cation Separation from Spent Chromium Plating Solutions", Industrial and Engineering Chemistry Research, vol. 48, pp. 6805-6810, published Jun. 4, 2009. (Year: 2009).*
Li, J.Y. and S. Nemat-Nasser, "Micromechanical analysis of ionic clustering in Nation perfluorinated membrane", Mechanics of Materials, vol. 32, pp. 303-314, published 2000. (Year: 2000).*
Official Communication issued in International Bureau of Wipo Patent Application No. PCT/JP2017/032367, dated Dec. 12, 2017, along with an English translation thereof.
Yasuhiro Hashimoto, Naoki Sakamoto and Hideki Iijima; Japanese Journal of Polymer Science and Technology (Kobunshi Ronbunshu), vol. 63, No. 3, pp. 166-173 (Mar. 2006) (with English language abstract on last page).
Supplementary European Search Report for EP 17848863.1, dated Aug. 19, 2019.

* cited by examiner

Primary Examiner — Stewart A Fraser
Assistant Examiner — Lilia Nedialkova
(74) Attorney, Agent, or Firm — Greenblum & Bernstein, P.L.C.

(57) ABSTRACT

A polymer electrolyte membrane according to the present invention has a cluster diameter of 2.96 to 4.00 nm and a converted puncture strength of 300 gf/50 μm or more. The polymer electrolyte membrane according to the present invention has a low electric resistance and an excellent mechanical strength.

8 Claims, No Drawings

POLYMER ELECTROLYTE MEMBRANE AND METHOD FOR PRODUCING THE SAME

TECHNICAL FIELD

The present invention relates to a polymer electrolyte membrane preferably used for polymer electrolyte fuel cell, redox flow battery, water electrolysis, soda electrolysis and the like, and a method for producing the same.

BACKGROUND ART

In recent years, there have increased needs for performance improvement of protonic-conductive polymer electrolyte membranes, and studies have been progressing, for example, on the fields of fuel cells (polymer electrolyte fuel cell), redox flow battery, water electrolysis and the like. With respect to polymer electrolyte membranes to be used in these applications, ion-exchange membranes composed of a perfluorocarbon polymer usually having sulfonic acid groups are broadly studied.

As a polymer electrolyte for a fuel cell, there is proposed a polymer electrolyte membrane containing a polymer or a blend of polymers, having an equivalent weight (EW) of lower than 1,200 and Tg of 101° C. to 155° C. (for example, see Patent Literature 1). There is also proposed a polymer electrolyte membrane for a redox flow secondary battery, having an ion cluster diameter of 1.00 to 2.95 nm (for example, see Patent Literature 2).

CITATION LIST

Patent Literature

Patent Literature 1: National Publication of International Patent Application No. 2007-511047
Patent Literature 2: International Publication No. WO 2013/100079A1

SUMMARY OF INVENTION

Technical Problem

It cannot be said that the electric resistance of the polymer electrolyte membranes described in Patent Literatures 1 and 2 may be sufficiently low from the viewpoint of providing a cell having a higher output density.

In order to reduce the electric resistance of polymer electrolyte membranes, a method of reducing the dry mass per one equivalent of an ion-exchange group, (equivalent weight: EW) a method of reducing the membrane thickness, and the like are conceivable; however, a remarkable reduction in EW causes problems such as a decrease in the mechanical strength of a membrane, and making a membrane become liable to creep in a long term operation to decrease the durability.

Then, protons must be hydrated in order to migrate in a polymer electrolyte membrane, and at this time, sulfonic acid groups form associates (ion clusters). Since uptake of water in the ion clusters forms ion conduction paths, larger ion cluster diameters can give better ion conductions, that is, more reduced electric resistances, but larger ion cluster diameters pose problems that the membrane becomes liable to swell and the mechanical strength decreases, and the like; then, there is demanded the development of a polymer electrolyte membrane low in electric resistance and high in mechanical strength.

The polymer electrolyte membranes described in Patent Literatures 1 and 2 have room for improvement from the above-mentioned viewpoints.

The present invention has been achieved in consideration of the above-mentioned problems of conventional technologies, and has an object to provide a polymer electrolyte membrane low in electric resistance and high in mechanical strength.

Solution to Problem

As a result of exhaustive studies to solve the above problems, the present inventors have found that a polymer electrolyte membrane having a large ion cluster diameter and a high mechanical strength can solve the above-mentioned various problems. That is, the present invention provides the following constitutions.

[1]
A polymer electrolyte membrane, having a cluster diameter of 2.96 to 4.00 nm and a converted puncture strength of 300 gf/50 μm or more.
[2]
The polymer electrolyte membrane according to [1], having an ion conductivity of 0.10 S/cm or more.
[3]
The polymer electrolyte membrane according to [1] or [2], comprising a mixture of two or more fluorine-based electrolyte polymers, each of which has an ion-exchange group and has a monomer structure different from each other.
[4]
The polymer electrolyte membrane according to any of [1] to [3], having an equivalent weight, EW, of 400 to 1,000 (g/eq).
[5]
The polymer electrolyte membrane according to [4], having the equivalent weight, EW, of 700 to 1,000 (g/eq).
[6]
A method for producing a polymer electrolyte membrane, comprising:
a) a step of mixing two or more fluorine-based electrolyte polymers, each of which has an ion-exchange group and has a monomer structure different from each other;
b) a step of casting the polymer electrolyte membrane from a suspension or a solution of the mixed fluorine-based electrolyte polymers; and
c) a step of subjecting the cast polymer electrolyte membrane to a heat treatment at a temperature of more than 210° C.
[7]
The method for producing the polymer electrolyte membrane according to [6], wherein the temperature of the heat treatment in the step c) is 215° C. or more.
[8]
The method for producing the polymer electrolyte membrane according to [6] or [7], wherein the polymer electrolyte membrane has a cluster diameter of 2.96 to 4.00 nm and a converted puncture strength of 300 gf/50 μm or more.
[9]
The method for producing the polymer electrolyte membrane according to any of [6] to [8], wherein the polymer electrolyte membrane has an equivalent weight, EW, of 400 to 1,000 (g/eq).

[10]

The method for producing the polymer electrolyte membrane according to [9], wherein the polymer electrolyte membrane has the equivalent weight, EW, of 700 to 1,000 (g/eq).

[11]

A polymer electrolyte membrane obtained by the method for producing the polymer electrolyte membrane according to any of [6] to [10]

[12]

A redox flow secondary battery, comprising the polymer electrolyte membrane according to any of [1] to [5], and [11].

[13]

A water electrolysis facility, comprising the polymer electrolyte membrane according to any of [1] to [5], and [11].

[14]

A membrane electrode assembly, comprising the polymer electrolyte membrane according to any of [1] to [5], and [11].

[15]

A fuel cell, comprising the membrane electrode assembly according to [14].

Advantageous Effect of Invention

The polymer electrolyte membrane according to the present invention is low in electric resistance and excellent in mechanical strength.

DESCRIPTION OF EMBODIMENT

Hereinafter, an embodiment (hereinafter, referred to as "present embodiment") to carry out the present invention will be described in detail. The following present embodiment is exemplification to explain the present invention, and has no effect of limiting the present invention to the following contents. Various changes and modifications within the gist of the present invention may be made to carry out the present invention.

<Polymer Electrolyte Membrane>

A polymer electrolyte membrane of the present embodiment has a cluster diameter of 2.96 to 4.00 nm and a converted puncture strength of 300 gf/50 μm or more. The polymer electrolyte membrane of the present embodiment, since being thus configured, is low in electric resistance and excellent in mechanical strength. That is, the polymer electrolyte membrane of the present embodiment can achieve high performance and high durability by use thereof as an electrolyte membrane for polymer electrolyte fuel cell, redox flow battery, water electrolysis and soda electrolysis.

(Ion Cluster)

Ion clusters are present in the polymer electrolyte membrane of the present embodiment. The ion cluster present in the polymer electrolyte membrane of the present embodiment is composed of: a hydrophobic moiety forming a fluorinated hydrocarbon moiety constituting the main chain of a polyelectrolyte polymer molecule; a moiety in which a plurality of hydrophilic groups gather (through molecules), the hydrophilic groups being ion-exchange groups located on the ends of side chains, forming a suitable molecular structure and length part thereof, bonded to the main chains; and water molecules coordinated on the periphery of the hydrophilic group moiety and free water collected in the vicinity thereof by the hydrogen bond and other affinities.

In the polymer electrolyte membrane of the present embodiment, a plurality of large-size channels (so-called ion clusters) and small-size ion channels connecting these are formed, and resultantly, ion channels run continuously in the membrane thickness direction, and function as ion (particularly, proton $H^+$) conduction paths (channels).

The ion cluster diameter in the polymer electrolyte membrane of the present embodiment, as measured in water at 25° C. by a small-angle X-ray method, is 2.96 to 4.00 nm, preferably 2.98 to 3.50 nm, more preferably 3.00 to 3.40 nm, especially preferably 3.02 to 3.30 nm, more especially preferably 3.02 to 3.20 nm and still more especially preferably 3.02 to 3.17 nm. For the polymer electrolyte membrane of the present embodiment, the ion cluster diameter of 4.00 nm or smaller makes large ions hardly permeate, improves the ion permselectivity and improves the strength of the membrane. On the other hand, the ion cluster diameter of 2.96 nm or larger makes protons ($H^+$) coordinating water molecules easily pass and decreases the electric resistance. In particular, in the case where the ion cluster diameter is 3.02 to 3.17 nm, the polymer electrolyte membrane of the present embodiment is likely to secure good ion conductivity and simultaneously to be largely improved in mechanical strength.

The number (number/nm$^3$) of the ion clusters per unit volume of the electrolyte membrane is preferably 0.06 to 0.25, more preferably 0.09 to 0.22 and still more preferably 0.12 to 0.20. In the case where the number of the ion clusters per unit volume is 0.25 or smaller, the membrane strength is likely to be improved; and the number being 0.06 or larger is likely to make the electric conductivity become much better (membrane electric resistance more decrease).

The specific calculation processes of the ion cluster diameter and the number of clusters are as follows. A polymer electrolyte membrane in the state of being immersed in water at 25° C. is subjected to a small-angle X-ray scattering measurement, and a blank cell scattering correction and an absolute intensity correction are made on an obtained scattering profile. In the case where the measurement is carried out using a two-dimensional detector, data is converted to one-dimensional data by reasonable means such as circular averaging to thereby determine the scattering angle dependency of scattering intensity. By using the scattering angle dependency of scattering intensity (scattering profile) thus obtained, the cluster diameter can be determined according to means described in Yasuhiro Hashimoto, Naoki Sakamoto, and Hideki Iijima, Kobunshi Ronbunshu (Japanese Journal of Polymer Science and Technology), vol. 63, No. 3, p. 166, 2006. That is, the cluster structure is assumed to be represented as core-shell-type rigid spheres having a particle size distribution; and a region where scattering originated from clusters in an actually measured scattering profile dominates is subjected to fitting by using a theoretical scattering formula based on this rigid sphere model to be thereby able to obtain an average cluster diameter (a cluster diameter) and a density of the number of clusters. In this model, the part of the core corresponds to a cluster, and the diameter of the core makes a cluster diameter. Here, the shell layer is virtual and the electron density of the shell layer is assumed to be equal to that of the matrix part. The thickness of the shell layer is assumed to be 0.25 nm. The theoretical scattering formula of the model used for the fitting is shown as Expression 1. In Expression 1, C represents an instrument constant; N, a density of the number of clusters; η, a volume fraction of the rigid spheres in the case where the core, that is, the cluster part, and the virtual shell surrounding it are assumed as the rigid sphere;

θ, a Bragg angle; λ, a wavelength of X-rays to be used; t, a shell layer thickness; $a_0$, an average cluster radius (a half of the cluster diameter); and σ, a standard deviation of the core diameters (the cluster diameters). $I_b(q)$ represents a background scattering including thermal diffuse scattering, and herein assumed to be a constant. On the fitting, among the above parameters, N, η, $a_0$, σ and $I_b(q)$ are taken as variable parameters.

$$I_{HS}(q) = CNS(q, a_2, \eta) \int_u^\infty P(a) \left[ \frac{4\pi a^3}{3} \Phi(qa) \right]^2 da + I_b(q) \quad \text{Expression 1}$$

where $$q = 4\pi \sin\theta / \lambda$$

$$S(q, a_2, \eta) = \frac{1}{1 + 24\eta[G(A)/A]}$$

$$G(A) = \frac{\alpha}{A^2}(\sin A - A\cos A) + \frac{\beta}{A^3}[2A\sin A + (2 - A^2)\cos A - 2] +$$

$$\frac{\gamma}{A^5}(-A^4\cos A + 4[(3A^2 - 6)\cos A + (A^3 - 6A)\sin A + 6])$$

$$\alpha = (1 + 2\eta)^2 / (1 - \eta)^4$$

$$\beta = -6\eta(1 + \eta/2)^2 / (1 - \eta)^4$$

$$\gamma = 1/2\eta(1 + 2\eta)^2 / (1 - \eta)^4$$

$$A = 2qa_2$$

$$a_2 = a + t$$

$$\Phi(qa) = \frac{3}{(qa)^3}[\sin(qa) - (qa)\cos(qa)]$$

$$P(a) = \frac{1}{\sqrt{2\pi}\,\sigma} \exp\left[-\frac{(a - a_0)^2}{2\sigma^2}\right]$$

The ion cluster diameter in the polymer electrolyte membrane of the present embodiment can be regulated by the polymer structure, the polymer composition, the membrane formation condition, and the like. For example, by reducing the equivalent weight (EW) of the polymer or regulating the heat treatment condition of the electrolyte membrane, the ion cluster diameter is likely to be made large.

(Converted Puncture Strength)

The converted puncture strength (a value per 50 μm of membrane thickness to which a puncture strength in a wet state is reduced) of the polymer electrolyte membrane of the present embodiment is 300 gf/50 μm or more, preferably 350 gf/50 μm or more and more preferably 400 gf/50 μm or more. In the case where the converted puncture strength is lower than 300 gf/50 μm, the mechanical strength necessary for the membrane thickness reduction is insufficient, then making it necessary for the membrane thickness to be made large, which case is therefore not preferable. In the present embodiment, the upper limit of the converted puncture strength is not especially established, but it is preferable, from the viewpoint of securing a proper water content, to make it to be 3,000 gf/50 μm or lower.

The converted puncture strength can be measured by a method described in Examples described later. Then the converted puncture strength can be regulated in the above range, for example, by the equivalent weight (EW), a heat treatment and the like. That is, making EW high or making the heat treatment temperature high is likely to make the converted puncture strength high; and making EW low or making the heat treatment temperature low is likely to make the converted puncture strength low.

(Ion Conductivity)

The ion conductivity of the polymer electrolyte membrane of the present embodiment in water at 30° C. is preferably 0.10 S/cm or more, more preferably 0.15 S/cm or more, still more preferably 0.20 S/cm or more and further still more preferably 0.25 S/cm or more. From the viewpoint of making the internal resistance sufficiently low, it is preferable to make the ion conductivity to be 0.10 S/cm or more. Then, even in the case where the ion conductivity is lowered by a heat treatment, carrying out a washing treatment can also bring about an increase in the ion conductivity.

(EW of the Electrolyte Membrane)

The equivalent weight (EW: the number of grams of a dry mass of a fluorine-based polyelectrolyte polymer per one equivalent of an ion-exchange group) of the polymer electrolyte membrane of the present embodiment is preferably 400 (g/eq) or more, more preferably 450 (g/eq) or more, still more preferably 600 (g/eq) or more and especially preferably 700 (g/eq) or more, and then preferably 1,000 (g/eq) or lower, more preferably 950 (g/eq) or lower and still more preferably 900 (g/eq) or lower.

When EW is high, since the mechanical strength is improved but the density of ion-exchange groups simultaneously becomes low, the ion conductivity is likely to decrease; and when the equivalent weight is too low, the decrease of the mechanical strength is likely to be caused; therefore, it is preferable to regulate EW as described above.

<Fluorine-Based Electrolyte Polymer>

It is preferable that the polymer electrolyte membrane of the present embodiment contain one or two or more fluorine-based electrolyte polymers. The fluorine-based electrolyte polymers are not especially limited as long as the polymers have a structure represented by the following formula (2), and may contain other structures.

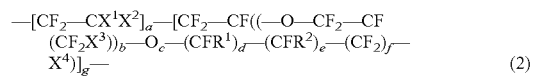

$X^1$, $X^2$, $X^3$, $R^1$, $R^2$ and a to g in the formula (2) are defined as follows, respectively.

$X^1$, $X^2$ and $X^3$ each independently denote one or more selected from the group consisting of halogen atoms and perfluoroalkyl groups having 1 to 3 carbon atoms. The halogen atom is not especially limited, but examples thereof include a fluorine atom, a chlorine atom, a bromine atom and an iodine atom. It is preferable, from the viewpoint of chemical stability including oxidative deterioration resistance of the polymer, that $X^1$, $X^2$ and $X^3$ be each a fluorine atom or a perfluoroalkyl group having 1 to 3 carbon atoms.

$X^4$ denotes COOZ, $SO_3Z$, $PO_3Z_2$ or $PO_3HZ$. Hereinafter, $X^4$ is referred to also as an "ion-exchange group". Z denotes a hydrogen atom, an alkali metal atom, an alkaline earth metal atom or an amine ($NH_4$, $NH_3R_1$, $NH_2R_1R_2$, $NHR_1R_2R_3$, $NR_1R_2R_3R_4$) where $R_1$, $R_2$, $R_3$ and $R_4$ each independently denote one or more selected from the group consisting of alkyl groups and arenes. Then in the case where $X^4$ is $PO_3Z_2$, Z may be identical or different. The alkali metal atom is not especially limited, and examples thereof include a lithium atom, a sodium atom and a potassium atom. Further the alkaline earth metal atom is not especially limited, and examples thereof include a calcium atom and a magnesium atom. It is preferable, from the viewpoint of chemical stability including oxidative deterioration resistance of the polymer, that $X^4$ be $SO_3Z$.

$R^1$ and $R^2$ each independently denote one or more selected from the group consisting of halogen atoms, perfluoroalkyl groups and fluorochloroalkyl groups having 1 to 10 carbon atoms. Here, the halogen atom is not especially limited, and examples thereof include a fluorine atom, a chlorine atom, a bromine atom and an iodine atom.

a and g denote numbers meeting $0 \leq a < 1$, $0 < g \leq 1$ and $a+g=1$. b denotes an integer of 0 to 8. c denotes 0 or 1. d, e and f each independently denote an integer of 0 to 6 (with the proviso that d, e and f are not 0 at the same time).

It is preferable, since the effect of the present embodiment is likely to become more remarkable, that the fluorine-based polyelectrolyte polymer of the present embodiment be a perfluorocarbonsulfonic acid resin (hereinafter, referred to also as a "PFSA resin"). The PFSA resin in the present embodiment is a resin in which perfluorocarbons as side chains are bonded to the main chain composed of a PTFE skeleton chain, and one or two or more sulfonic acid groups (part thereof may be a form of a salt in some cases) are bonded to the each side chain.

It is preferable that the PFSA resin contain a repeating unit represented by —($CF_2$—$CF_2$)— and a repeating unit derived from a compound represented by the following formula (3) or (4-1) or (4-2).

$$CF_2=CF(-O-(CF_2CFXO)_n-[A]) \quad (3)$$

wherein X denotes F or a perfluoroalkyl group having 1 to 3 carbon atoms; n denotes an integer of 0 to 5; and [A] denotes $(CF_2)_m$—$SO_3H$, and m denotes an integer of 0 to 6, with the proviso that n and m are not 0 at the same time.

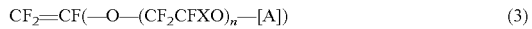
$$CF_2=CF-O-(CF_2)_P-CFX(-O-(CF_2)_K-SO_3H) \quad (4\text{-}1)$$

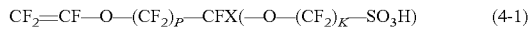
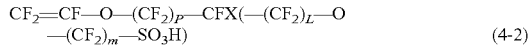
$$CF_2=CF-O-(CF_2)_P-CFX(-(CF_2)_L-O-(CF_2)_m-SO_3H) \quad (4\text{-}2)$$

wherein in the formulae (4-1) and (4-2), X denotes a perfluoroalkyl group having 1 to 3 carbon atoms; P denotes an integer of 0 to 12; K denotes an integer of 1 to 5; L denotes an integer of 1 to 5; m denotes an integer of 0 to 6; with the proviso that K and L may be identical or different, and P, K and L are not 0 at the same time.

The PFSA resin is a copolymer containing a repeating unit represented by —($CF_2$—$CF_2$)— and a repeating unit represented by —($CF_2$—$CF(-O-(CF_2CFXO)_n-(CF_2)_m-SO_3H)$)— (wherein X denotes F or $CF_3$; n denotes an integer of 0 to 5; m denotes an integer of 0 to 12; with the proviso that n and m are not 0 at the same time), and it is more preferable that the PFSA resin be a copolymer containing at least one repeating unit represented by —($CF_2$—$CF(-O-(CF_2CFXO)_n-(CF_2)_m-SO_3H)$)— (wherein X denotes $CF_3$; n denotes 0 or 1; m denotes an integer of 0 to 12; with the proviso that n and m are not 0 at the same time). In the case where the PFSA resin is a copolymer having the above structure and has a predetermined equivalent weight (EW), it is likely that an obtained polymer electrolyte membrane has sufficient hydrophilicity and the resistance to radical species generated in oxidative deterioration becomes high.

Further in the case where the PFSA resin contains a repeating unit in which n is 0 and m is an integer of 1 to 6 out of the repeating units represented by the above —($CF_2$—$CF(-O-(CF_2CFXO)_n-(CF_2)_m-SO_3H)$)— of the PFSA resin, or the PFSA resin contains both repeating units of —$CF_2$—$CFX(-O-(CF_2)_P-CFX$ $(-O-(CF_2)_K-SO_3H)$— and —$CF_2$—$CFX(-O-(CF_2)_P-CFX$ $(-(CF_2)_L-O-(CF_2)_m-SO_3H)$—, which are derived from a compound represented by the formula (4-1) and a compound represented by the formula (4-2), respectively, it is likely that the equivalent weight (EW) becomes low and hydrophilicity of an obtained polymer electrolyte membrane becomes high.

It is more preferable, since the effect of the present embodiment is likely to become more remarkable, that the fluorine-based electrolyte polymer represented by the formula (2) in the present embodiment be a PFSA resin having a structure represented by the following formula (5).

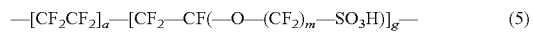
$$-[CF_2CF_2]_a-[CF_2-CF(-O-(CF_2)_m-SO_3H)]_g- \quad (5)$$

wherein a and g denote numbers meeting $0 \leq a < 1$, $0 < g \leq 1$ and $a+g=1$; and m denotes an integer of 1 to 6.

The fluorine-based electrolyte polymer represented by the above formula (2) and the PFSA resin having a structure of the above formula (5) in the present embodiment are not especially limited as long as they have the structures represented by the above formula (2) and the above formula (5), respectively, and may contain other structures.

The fluorine-based electrolyte polymer represented by the above formula (2) and the PFSA resin having a structure of the above formula (5) in the present embodiment may be those in which part of ion-exchange groups is subjected to a directly or indirectly intermolecular partial crosslinking reaction. The partial crosslinking is preferable from the viewpoint of being able to control the solubility and the excessive swelling.

For example, even if EW of the fluorine-based polyelectrolyte polymer is about 280 (g/eq), by carrying out the above partial crosslinking, the water dissolvability of the fluorine-based electrolyte polymer can be lowered (the water resistance is improved).

Then also in the case where the fluorine-based electrolyte polymer is in a low melt flow region (polymer region), by the partial crosslinking, the intermolecular entanglement can be increased and the solubility and the excessive swelling can be reduced.

Examples of the partial crosslinking reaction include reactions of an ion-exchange group with a functional group or the main chain of another molecule, reactions between ion-exchange groups, and crosslinking reactions (covalent bonding) through an oxidation-resistant low molecular compound, an oligomer, a polymeric substance or the like, and in some cases, the reaction may be a reaction with a salt (including an ionic bond with a $SO_3H$ group)-forming substance. Examples of the oxidation-resistant low molecular compound, the oligomer or the polymeric substance include polyhydric alcohols and organic diamines.

The molecular weight of the fluorine-based electrolyte polymer in the present embodiment is not especially limited, but is, in terms of value of a melt flow index (MFI) measured according to ASTM:D1238 (measurement condition: a temperature of 270° C., a load of 2,160 g), preferably 0.05 to 50 (g/10 min), more preferably 0.1 to 30 (g/10 min) and still more preferably 0.5 to 20 (g/10 min).

(EW of the Fluorine-Based Electrolyte Polymer)

The equivalent weight, EW (the number of grams of a dry mass of a fluorine-based electrolyte polymer per one equivalent of an ion-exchange group) of the fluorine-based electrolyte polymer to be used for the polymer electrolyte membrane of the present embodiment is preferably 300 (g/eq) or more, more preferably 350 (g/eq) or more, still more preferably 400 (g/eq) or more and especially preferably 450 (g/eq) or more, and then preferably 1,300 (g/eq) or lower, more preferably 1,000 (g/eq) or lower, still more preferably 900 (g/eq) or lower and especially preferably 750 (g/eq) or lower.

By regulating EW of the fluorine-based electrolyte polymer having a structure represented by the above formula (2) in the above range, in cooperation with its chemical structure, excellent hydrophilicity can be imparted to an ion-exchange resin composition containing the polymer; and a polymer electrolyte membrane obtained by using the resin composition has a lower electric resistance and the cell performance is likely to be more improved. That is, it is preferable, from the viewpoint of the hydrophilicity and the water resistance of the membrane, that EW of the fluorine-based electrolyte polymer be 300 or more, and it is preferable, from the viewpoint of the hydrophilicity and the electric resistance of the membrane, that the EW be 1,300 or lower.

The equivalent weight EW of the fluorine-based electrolyte polymer can be measured by salt substituting the fluorine-based electrolyte polymer and back titrating a solution thereof with an alkali solution.

The EW can be regulated by selections of the copolymerization ratio of a fluorine-containing monomer being a starting material of the fluorine-based electrolyte polymer, the monomer species, and the like.

(Method for Producing the Fluorine-Based Electrolyte Polymer)

The fluorine-based electrolyte polymer in the present embodiment can be obtained, for example, by producing a precursor (hereinafter, referred to also as a "resin precursor") of the fluorine-based electrolyte polymer, and thereafter subjecting the precursor to a hydrolysis treatment.

In the case of the PFSA resin, it can be obtained, for example, by hydrolyzing a PFSA resin precursor composed of a copolymer of a fluorinated vinyl ether compound represented by the following general formula (6) or (7) with a fluoroolefin monomer represented by the following general formula (8).

$$CF_2=CF-O-(CF_2CFXO)_n-A \quad (6)$$

wherein X denotes F or a perfluoroalkyl group having 1 to 3 carbon atoms; n denotes an integer of 0 to 5; and A denotes $(CF_2)_m$—W, wherein m denotes an integer of 0 to 6, n and m are not 0 at the same time, and W denotes a functional group convertible to $SO_3H$ by hydrolysis.

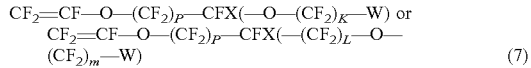

$$CF_2=CF-O-(CF_2)_P-CFX(-O-(CF_2)_K-W) \text{ or}$$
$$CF_2=CF-O-(CF_2)_P-CFX(-(CF_2)_L-O-(CF_2)_m-W) \quad (7)$$

wherein X denotes a perfluoroalkyl group having 1 to 3 carbon atoms; P denotes an integer of 0 to 12; K denotes an integer of 1 to 5; L denotes an integer of 1 to 5; then L, K and m are not 0 at the same time; m denotes an integer of 0 to 6; and W denotes a functional group convertible to $SO_3H$ by hydrolysis.

$$CF_2=CFZ \quad (8)$$

wherein Z denotes H, Cl, F, a perfluoroalkyl group having 1 to 3 carbon atoms, or a cyclic perfluoroalkyl group which may contain oxygen.

W denoting a functional group convertible to $SO_3H$ by hydrolysis in the above formula (6) is not especially limited, but $SO_2F$, $SO_2Cl$ or $SO_2Br$ is preferable. Further in the formula (6), it is more preferable that $X=CF_3$, $W=SO_2F$ and $Z=F$. It is especially preferable, since being likely to provide a solution of the resin having high hydrophilicity and of a high resin concentration, that n=0, m=an integer of 0 to 6, and $X=CF_3$, $W=SO_2F$ and $Z=F$.

The resin precursor in the present embodiment can be synthesized by well-known means. The resin precursor can be produced, for example, by polymerizing a fluorinated vinyl compound having a group (ion-exchange group precursor group) convertible to an ion-exchange group ($X^4$ in the formula (2)) by hydrolysis or the like in the presence of a radical generator or the like, such as a peroxide, with a fluoroolefin such as tetrafluoroethylene (TFE). The polymerization method is not especially limited, and there can be used, for example, a polymerization method (solution polymerization) in which the fluorinated vinyl compound or the like and a gas of the fluoroolefin are filled and dissolved in a polymerization solvent such as a fluorine-containing hydrocarbon, and allowed to react, a polymerization method (bulk polymerization) in which the fluorinated vinyl compound itself is used as a polymerization solvent without using a solvent such as a fluorine-containing hydrocarbon, a polymerization method (emulsion polymerization) in which the fluorinated vinyl compound and a gas of the fluoroolefin are filled and allowed them to react in a medium of an aqueous solution of a surfactant, a polymerization method (emulsion polymerization) in which the fluorinated vinyl compound and a gas of the fluoroolefin are filled in an aqueous solution of a surfactant and an emulsifying aid such as an alcohol to emulsify, and allowed them to react, and a polymerization method (suspension polymerization) in which the fluorinated vinyl compound and a gas of the fluoroolefin are filled in an aqueous solution of a suspension stabilizer to suspend, and allowed them to react.

Any resin precursor fabricated by any of the above-mentioned polymerization methods can be used as the resin precursor of the present embodiment. A block or tapered polymer obtained by regulating the polymerization condition such as the amount of TFE gas supplied may be used as the resin precursor.

The resin precursor may be one prepared by treating impure terminals and structurally easily-oxidizable moieties (CO groups, H-bonded moieties and the like) produced in a resin molecular structure during the polymerization reaction, in fluorine gas by a well-known method to thereby fluorinate the moieties.

In the resin precursor, part of the ion-exchange group precursor groups (for example, $SO_2F$ group) may be partially (including intermolecularly) imidized (alkylimidized or otherwise).

The molecular weight of the resin precursor is not especially limited, but is, in terms of value of a melt flow index (MFI) measured according to ASTM:D1238 (measurement condition: a temperature of 270° C., a load of 2,160 g), preferably 0.05 to 50 (g/10 min), more preferably 0.1 to 30 (g/10 min) and still more preferably 0.5 to 20 (g/10 min).

The shape of the resin precursor is not especially limited, but is, from the viewpoint of accelerating treatment rates in a hydrolysis treatment and an acid treatment described later, preferably a pellet-shape of 0.5 cm³ or smaller, a dispersion liquid-form, or a powdery particle-shape; among these, it is preferable to use powdery bodies after the polymerization. From the viewpoint of costs, an extruded film-shaped resin precursor may be used.

A method for producing the fluorine-based electrolyte polymer of the present embodiment from the resin precursor is not especially limited, and examples thereof include a method in which the resin precursor is extruded through a nozzle, a die, or the like by using an extruder, and thereafter is subjected to a hydrolysis treatment, and a method in which the resin precursor product as it is when polymerized, that is, a dispersion liquid form thereof, or a product thereof made powdery by precipitation and filtration is thereafter subjected to a hydrolysis treatment.

A method for producing the fluorine-based electrolyte polymer of the present embodiment from the resin precursor is not especially limited, and examples thereof include a method in which the resin precursor is extruded through a nozzle, a die, or the like by using an extruder, and thereafter is subjected to a hydrolysis treatment, and a method in which the resin precursor product as it is when polymerized, that is, a dispersion liquid form thereof, or a product thereof made powdery by precipitation and filtration is thereafter subjected to a hydrolysis treatment.

More specifically, a resin precursor obtained as in the above, and as required, molded, is then immersed in a basic reaction liquid to be thereby subjected to a hydrolysis treatment. The basic reaction liquid to be used in the hydrolysis treatment is not especially limited, but preferable are an aqueous solution of an amine compound such as dimethylamine, diethylamine, monomethylamine or monoethylamine, and an aqueous solution of a hydroxide of an alkali metal or an alkaline earth metal; and especially preferable are aqueous solutions of sodium hydroxide and potassium hydroxide. In the case of using a hydroxide of an alkali metal or an alkaline earth metal, the content thereof is not especially limited, but it is preferable that the content be 10 to 30% by mass with respect to the whole of a reaction liquid. It is more preferable that the reaction liquid further contain a swelling organic compound such as methyl alcohol, ethyl alcohol, acetone and dimethyl sulfoxide (DMSO). It is preferable that the content of the swelling organic compound be 1 to 30% by mass with respect to the whole of the reaction liquid.

The resin precursor is subjected to a hydrolysis treatment in the basic reaction liquid, thereafter sufficiently washed with warm water or the like, and thereafter subjected to an acid treatment. An acid to be used in the acid treatment is not especially limited, but preferable is a mineral acid such as hydrochloric acid, sulfuric acid or nitric acid, or an organic acid such as oxalic acid, acetic acid, formic acid or trifluoroacetic acid, and more preferable is a mixture of these acids and water. The above acids may be used singly or concurrently in two or more. The basic reaction liquid used in the hydrolysis treatment may be removed by a treatment with a cation-exchange resin previously before the acid treatment.

An ion-exchange group precursor group of the resin precursor is protonated by the acid treatment to thereby produce an ion-exchange group. For example, in the case of a PFSA resin precursor produced by using the above formula (6), W in the formula (6) is protonated by the acid treatment to thereby make $SO_3H$. A fluorine-based electrolyte polymer obtained by the hydrolysis treatment and the acid treatment is enabled to be dispersed or dissolved in a protonic organic solvent, water, or a mixed solvent of the both, to thereby become a suspension or a solution.

The fluorine-based electrolyte polymer may contain an alkali metal, an alkaline earth metal or besides, a radically decomposable transition metal (Ce compound, Mn compound or the like) in a form of a partial salt (about 0.01 to 5 equivalent % of the equivalent of the whole ion-exchange group) therewith or singly or in a form in concurrent use therewith of a basic polymer described later.

It is preferable, from the viewpoint of making the electric resistance and the mechanical strength better, that the polymer electrolyte membrane of the present embodiment contain a mixture of two or more fluorine-based electrolyte polymers having ion-exchange groups and having respective different monomer structures.

Mixing two or more fluorine-based electrolyte polymers enables excellent characteristics in which respective functions are merged to be exhibited.

From the viewpoint of making the mechanical strength better, when two or more fluorine-based electrolyte polymers are mixed, it is preferable to make the proportion of a polymer thereof having a higher EW to be higher than 50% by weight; it is more preferable to make that to be 55% by weight or more; and it is still more preferable to make that to be 60% by weight or more. Since the polymer having a higher EW is likely to give higher crystallinity, in the case of making the proportion to be the above one, a higher mechanical strength is likely to be developed.

(Reinforcing Material)

It is preferable, from the viewpoint of the membrane strength, that the polymer electrolyte membrane of the present embodiment have a reinforcing material. The reinforcing material is not especially limited, and examples thereof include usual nonwoven fabrics and woven cloths, and porous membranes composed of various types of materials.

The porous membranes are not especially limited, but preferable are ones having good affinity for the fluorine-based electrolyte polymer; among these, reinforcing membranes in which a PTFA-based membrane stretched and made porous is utilized and the fluorine-based electrolyte polymer of the present embodiment is embedded in the membrane so as to leave practically no gaps are more preferable from the viewpoint of the strength and from the viewpoint of suppressing the dimensional change in the plane (lengthwise and breadthwise) direction.

<Method for Producing the Polymer Electrolyte Membrane>

The polymer electrolyte membrane of the present embodiment can be produced preferably by using a mixture of two or more fluorine-based electrolyte polymers, each of which has an ion-exchange group and has a monomer structure different from each other. That is, it is preferable to use, as starting materials of the polymer electrolyte membrane, a mixture obtained by suitably mixing two or more fluorine-based electrolyte polymers having respective different structures (originated from monomers), any of which has ion-exchange groups. A method of mixing a suspension or a solution of two or more fluorine-based electrolyte polymers having ion-exchange groups and having respective different monomer structures in the present embodiment is not especially limited, and the suspension or the solution can be mixed by a well-known method using a stirring blade or a mixer. After the mixing, in order to make the viscosity suitable for cast membrane formation, the suspension or the solution may be added with an auxiliary solvent, or even may be concentrated.

A method for producing the polymer electrolyte membrane (membrane forming method) in the present embodiment is not especially limited, and well-known cast membrane formation can be used such as bar coating or slit coating. The polymer electrolyte membrane may be of a single layer or a multilayer (two to five layers).

Then, the polymer electrolyte membrane formed by the above method is sufficiently washed with water (or, as required, before water washing, treated with an aqueous acidic liquid such as dilute hydrochloric acid, nitric acid or sulfuric acid) to thereby remove impurities, and is subjected to a heat treatment in air or an inert gas (preferably in an inert gas) preferably at higher than 210° C., more preferably at 215° C. or more, still more preferably 218° C. or more and further still more preferably 220° C. or more for 1 to 30 min.

Further the temperature of the heat treatment is, from the viewpoint of suppressing the decomposition of the polyelectrolyte membrane, preferably 350° C. or lower, more preferably 300° C. or lower, and still more preferably 280° C. or lower.

The time of the heat treatment is more preferably 2 to 20 min, still more preferably 3 to 15 min and especially preferably 5 to 10 min.

Since in the membrane in the state as it is at the time of the membrane formation, sufficient entanglement is not made among particles (among primary particles and secondary particles) and among molecules originated from starting materials, the heat treatment is useful for the purpose of making entanglement among the particles and among the molecules, in particular, stabilizing the water resistance (particularly lowering the hot water-dissolving component proportion) and the saturated water absorption rate, and forming stable clusters. The heat treatment is useful also from the viewpoint of improving the membrane strength.

It is presumed that the heat treatment forms fine intermolecular crosslinking among the molecules of the fluorine-based electrolyte polymer, thereby contributing to the water resistance and the stable cluster formation, and further attaining an effect of uniformizing the cluster diameters.

As described above, it is preferable that the method for producing the polymer electrolyte membrane according to the present embodiment comprise a) a step of mixing two or more fluorine-based electrolyte polymers having ion-exchange groups and having respective different monomer structures, b) a step of casting a polymer electrolyte membrane from a suspension or a solution of the mixed fluorine-based electrolyte polymers, and c) a step of subjecting the cast polymer electrolyte membrane to a heat treatment at a temperature of more than 210° C.

As a method in the (a) step of mixing two or more fluorine-based electrolyte polymers, any method may be adopted such as a method of mixing suspensions or solutions, a method of suspending or dissolving one suspension or solution in another polymer (solid), or a method of melting and mixing solid polymers, but preferable is the method of mixing suspensions or solutions.

(Applications)

The polymer electrolyte membrane of the present embodiment can be applied to various applications. Such applications are not limited to the following, but examples thereof include redox flow secondary battery, water electrolysis facilities and fuel cell. When the polymer electrolyte membrane is applied to fuel cell, by combining it with electrodes, membrane electrode assemblies can also be made. That is, a redox flow battery of the present embodiment contains the polymer electrolyte membrane of the present embodiment, and as members other than the polymer electrolyte membrane, well-known various ones can be applied. A water electrolysis facility of the present embodiment contains the polymer electrolyte membrane of the present embodiment, and as members other than the polymer electrolyte membrane, well-known various ones can be applied. Further a membrane electrode assembly of the present embodiment can be one containing the polymer electrolyte membrane of the present embodiment, and as members (negative electrode, positive electrode and the like) other than the polymer electrolyte membrane, well-known various ones can be applied. Further a fuel cell of the present embodiment can be one containing the membrane electrode assembly of the present embodiment, and as members other than the membrane electrode assembly, well-known various ones can be applied.

EXAMPLES

Hereinafter, the present embodiment will be described more specifically by way of Examples, but is not any more limited thereto. Here, evaluation methods and measurement methods used for the present embodiment were as follows.

(Membrane Thickness)

A polymer electrolyte membrane was allowed to stand in a thermostatic chamber at 23° C. at a relative humidity of 65% for 12 hours or longer, and thereafter the membrane thickness thereof was measured by using a contact-type film thickness meter (Toyo Seiki Seisaku-sho Ltd.: B-1).

(Ion Cluster Diameter)

The ion cluster diameter was measured by using a small-angle X-ray scattering (SAXS). A polymer electrolyte membrane was immersed in water at 25° C. for 24 hours; and a point-focused X-ray beam was made incident on the membrane in the state of being immersed in water from the normal direction to the membrane, and transmitted scattered light was detected. The measurement used a small angle X-ray scattering measurement apparatus, Nano Viewer, manufactured by Rigaku Corp.; the measurement in a small-angle region was carried out with the distance between a sample and a detector of 841 mm and by using PILATUS100K as the detector, and the measurement in a wide-angle region was carried out with the distance between the sample and a detector of 75 mm and by using an imaging plate as the detector; and by merging both profiles, there was obtained scattering data in the scattering angle in the range of $0.1°<$scattering angle $(2\theta)<30°$. The measurement was carried out on the sample in the state of seven pieces of the membrane being stacked; and the exposure time was made to be 15 min for both the small-angle region and the wide-angle region. In the case where data was acquired by a two-dimensional detector, the data is converted to one-dimensional data by reasonable means such as circular averaging. On the obtained SAXS profile, there were made corrections originated from the detector, such as the dark current correction of the detector, and corrections (blank cell scattering correction) for scattering by substances other than the sample. In the case where the effect (effect of smear) of the shape of the X-ray beam on the SAXS profile was large, a correction (desmear) for the X-ray beam shape was made. The ion cluster diameter was determined from a one-dimensional SAXS profile thus obtained according to means described in Yasuhiro Hashimoto, Naoki Sakamoto, and Hideki Iijima, Kobunshi Ronbunshu (Japanese Journal of Polymer Science and Technology), vol. 63, No. 3, p. 166, 2006. That is, the ion cluster structure was assumed to be represented as core-shell-type rigid spheres having a particle size distribution; and SAXS profile of a scattering angle region where scattering originated from ion clusters in an actually measured SAXS profile dominated was subjected to fitting by using a theoretical scattering formula based on this rigid sphere model to be thereby able to obtain an average cluster diameter and a density of the number of clusters. In this model, the part of the core was assumed to correspond to an ion cluster; and the diameter of the core was assumed to make an ion cluster diameter. Here, the shell layer was virtual and the electron density of the shell layer was assumed to be equal to that of the matrix part. The thickness of the shell layer was assumed to be 0.25 nm. The theoretical scattering formula of the model used for the fitting is shown as the following Expression 1. The fitting range was set in $1.4°<2\theta<6.7°$.

$$I_{HS}(q) = CNS(q, a_2, \eta) \int_u^\infty P(a) \left[\frac{4\pi a^3}{3}\Phi(qa)\right]^2 da + I_b(q) \quad \text{Expression 1}$$

where $q = 4\pi \sin\theta / \lambda$ $S(q, a_2, \eta) = \dfrac{1}{1 + 24\eta[G(A)/A]}$ $G(A) =$ $\dfrac{\alpha}{A^2}(\sin A - A\cos A) + \dfrac{\beta}{A^3}[2A\sin A + (2 - A^2)\cos A - 2] +$ $\dfrac{\gamma}{A^5}(-A^4\cos A + 4[(3A^2 - 6)\cos A + (A^3 - 6A)\sin A + 6])$ $\alpha = (1 + 2\eta)^2 / (1 - \eta)^4$ $\beta = -6\eta(1 + \eta/2)^2 / (1 - \eta)^4$ $\gamma = 1/2\eta(1 + 2\eta)^2 / (1 - \eta)^4$ $A = 2qa_2$ $a_2 = a + t$ $\Phi(qa) = \dfrac{3}{(qa)^3}[\sin(qa) - (qa)\cos(qa)]$ $P(a) = \dfrac{1}{\sqrt{2\pi}\,\sigma}\exp\left[-\dfrac{(a - a_0)^2}{2\sigma^2}\right]$ In Expression 1, C represented an instrument constant; N, a density of the number of clusters; η, a volume fraction of rigid spheres in the case where the core, that is, the cluster part, and the virtual shell surrounding it were assumed as the rigid sphere; θ, a Bragg angle; λ, a wavelength of X-rays to be used; t, a shell layer thickness; $a_0$, an average ion cluster radius; Γ(x), a gamma function; and σ, a standard deviation of ion cluster radii (core radii). P(a) represented a distribution function of the core radii a wherein the volume distribution of a was assumed to follow a Gaussian distribution P(a). $I_b(q)$ represented a background scattering including scattering originated from excessive water and thermal diffuse scattering in the measurement, and was herein assumed to be a constant. On the fitting, among the above parameters, N, η, $a_0$, σ and $I_b(q)$ were taken as variable parameters. Here, in the present description, the ion cluster diameter means an average diameter ($2a_0$) of the ion cluster.

(Converted Puncture Strength)

The polymer electrolyte membrane was immersed in water at 30° C. for 1 hour, and the membrane thickness thereof in swelling was measured by using a contact-type film thickness meter (Toyo Seiki Seisaku-sho Ltd.: B-1).

After the membrane thickness was measured, the polymer electrolyte membrane was subjected to a puncture test, in a thermostatic water bath regulated at 30° C., using a handy compression tester (manufactured by Kato Tech Co., Ltd.: KES-G5) under the condition of a curvature radius of its needle tip of 0.5 mm and a puncture rate of 2 mm/sec, and a maximum puncture load acquired was defined as a puncture strength (gf). Further by multiplying the puncture strength by a 50 (μm)/membrane thickness (μm), a converted puncture strength (gf/50 μm) was calculated.

(EW of the Polymer Electrolyte Membrane)

About 0.02 to 0.10 g of the polymer electrolyte membrane was immersed in 50 mL of a saturated NaCl aqueous solution (0.26 g/mL) at 25° C., and was left under stirring for 10 min, and thereafter, was subjected to a neutralization titration using a 0.01N sodium hydroxide aqueous solution of a special grade reagent, manufactured by Wako Pure Chemical Industries, Ltd., and using, as an indicator, phenolphthalein of a special grade reagent, manufactured by Wako Pure Chemical Industries, Ltd. A Na-type ion-exchange membrane obtained after the neutralization was rinsed with pure water, and thereafter vacuum dried and weighed. The equivalent of sodium hydroxide used for the neutralization was taken as M (mmol), and the mass of the Na-type ion-exchange membrane was taken as W (mg), and the equivalent weight (g/eq) was determined from the following expression.

$EW = (W/M) - 22$

The above operation was repeated five times; and thereafter, the maximum value and the minimum value in the five calculated EW values were excluded, and the three values were arithmetically averaged to thereby determine a measurement result.

(Ion Conductivity of the Polymer Electrolyte Membrane)

The polymer electrolyte membrane was cut out into a strip shape of 1 cm in width; and 6 electrode wires of 0.5 mm in diameter were brought into contact with the surface of the strip, parallel at intervals of 1 cm. Then the polymer electrolyte membrane was held in a thermostatic water bath regulated at 30° C. for 1 hour or more, and thereafter subjected to a resistance measurement by an alternating current impedance method (10 kHz); and the resistance value per unit length was measured from the distance between the electrodes and the resistance. Thereby, the ion conductivity Z (S/cm) at 30° C. was determined by using the following expression.

$Z = 1/$a membrane thickness (cm)/a membrane width (cm)/a resistance value per unit length (Ω/cm)

Example 1

A fluorine-based electrolyte polymer precursor composed of a copolymer of a fluoroolefin ($CF_2=CF_2$) in which Z=F in the above formula (8) with a fluorinated vinyl compound ($CF_2=CF-O-(CF_2)_2-SO_2F$) in which m=2, n=0 and W=$SO_2F$ in the above formula (6) was extruded at 270° C. from a round nozzle by using an extruder, and thereafter cut to thereby make cylindrical pellets of 2 to 3 mm in diameter and 4 to 5 mm in length. 510 g of the fluorine-based electrolyte polymer precursor pellets was immersed in 2,460 g of a KOH aqueous solution in which KOH and DMSO were added and previously regulated so as to make a KOH concentration of 15% by mass and a DMSO concentration of 30% by mass, for 6 hours to thereby convert $SO_2F$ groups in the fluorine-based electrolyte polymer precursor to $SO_3K$ groups.

The above treated pellets were immersed in a 1N HCl (2,500 mL) at 60° C. for 6 hours, and thereafter washed with an ion-exchange water (conductivity: 0.06 S/cm or lower) at 60° C. and dried to thereby obtain a fluorine-based electrolyte polymer (equivalent weight: 720 g/eq) having proton-exchange groups in which the above $SO_3K$ groups were converted to $SO_3H$ groups.

Then, 120 g of the fluorine-based electrolyte polymer (water content: 28.7% by mass), 485 g of ethanol and 949 g of ion-exchange water were charged in a glass internal cylinder in a SUS304-made 5 L-volume autoclave having the glass internal cylinder; and 70 g of ethanol and 140 g of ion-exchange water were charged between the internal cylinder and the inner wall of the autoclave. The liquid in the glass internal cylinder was subjected to a dispersing treatment at 162° C. for 4 hours under stirring. The internal pressure of the autoclave rose as the temperature was raised and the maximum pressure was 1.2 MPa. The resultant was taken out from the autoclave after being cooled to thereby obtain a homogeneous transparent fluorine-based electrolyte polymer solution AZ0. The composition of the AZ0 was 5.0% by mass of a fluorine-based electrolyte polymer, 30.0% by mass of ethanol and 65.0% by mass of water.

Then, 350 g of the fluorine-based electrolyte polymer solution AZ0 was charged in a 500-mL recovery flask; and the solution was concentrated until the concentration of the fluorine-based electrolyte polymer became 20% by mass, by azeotropic distillation at a vacuum degree of 0.04 MPa and at 80° C. using a rotary evaporator R-200, manufactured by Buchi Labotechnik AG, with the rotation being at 40 rpm, to thereby obtain a fluorine-based electrolyte polymer solution AZ1 (equivalent weight: 720 g/eq). The composition of the AZ1 was 20.0% by mass of a fluorine-based electrolyte polymer, 0.1% by mass of ethanol and 79.9% by mass of water.

By the similar procedure as in the above, there was obtained a fluorine-based electrolyte polymer (equivalent weight: 920 g/eq) solution AS1 composed of a copolymer of a fluoroolefin ($CF_2=CF_2$) in which Z=F in the above formula (8) with a fluorinated vinyl compound ($CF_2=CF-O-(CF_2CF_2O)-(CF_2)_2-SO_2F$) in which m=2, n=1, X=F and W=$SO_2F$ in the above formula (6). The composition of the AS1 was 15.0% by mass of a fluorine-based electrolyte polymer, 0.4% by mass of ethanol and 84.6% by mass of water.

Then, 100 g of the polymer solution AZ1 was charged in a 500-mL beaker made of polymer, and 133 g of the polymer solution AS1 was charged under stirring by a stirrer to thereby obtain a mixed solution MS1.

The obtained mixed solution MS1 was cast to form a membrane on a polyimide (PI) film by using a blade coater so that the membrane thickness after drying became 50 μm, and dried at 80° C. to thereby form a polymer electrolyte membrane. Finally, the polymer electrolyte membrane was put in a hot air drier set at 215° C. for 20 min to carry out a heat treatment to thereby form a polymer electrolyte membrane. That is, the heat treatment temperature (hereinafter, referred to also as "annealing temperature") of Example 1 was 215° C.

Example 2

A polymer electrolyte membrane was obtained as in Example 1, except for charging 100 g of the polymer solution AZ1, charging 57 g of the polymer solution AS1 under stirring by a stirrer and making the annealing temperature to be 220° C.

Example 3

A polymer electrolyte membrane was obtained as in Example 2, except for using a polymer solution AZ2 prepared by so regulating the polymer solution AZ1 having an equivalent weight of 720 g/eq that the equivalent weight thereof became 500 g/eq, in place of the polymer solution AZ1.

Various physical properties of the polymer electrolyte membranes of Examples 1 to 3 are shown in Table 1. Any of the polymer electrolyte membranes had a low resistance (high ion conductivity) and a high strength.

Comparative Example 1

By the similar procedure as in Example 1, there was obtained a fluorine-based electrolyte polymer (equivalent weight: 1,060 g/eq) solution AS2 composed of a copolymer of a fluoroolefin ($CF_2=CF_2$) in which Z=F in the above formula (8) with a fluorinated vinyl compound ($CF_2=CF-O-(CF_2CF_2O)-(CF_2)_2-SO_2F$) in which m=2, n=1, X=F and W=$SO_2F$ in the above formula (6).

The obtained solution AS2 was cast to form a membrane on a polyimide (PI) film by using a blade coater so that the membrane thickness after drying became 50 μm, and dried at 80° C. to thereby form an electrolyte membrane. Finally, the electrolyte membrane was put in a hot air drier set at 190° C. for 20 min to carry out a heat treatment to thereby obtain an electrolyte membrane. That is, the annealing temperature of Comparative Example 1 was 190° C.

Comparative Example 2

By the similar procedure as in Example 1, there was obtained a fluorine-based electrolyte polymer (equivalent weight: 720 g/eq) solution AZ1 composed of a copolymer of a fluoroolefin ($CF_2=CF_2$) in which Z=F in the above formula (8) with a fluorinated vinyl compound ($CF_2=CF-O-(CF_2)_2-SO_2F$) in which m=2, n=0 and W=$SO_2F$ in the above formula (6).

The obtained solution AZ1 was cast to form a membrane on a polyimide (PI) film by using a blade coater so that the membrane thickness after drying became 50 μm, and dried at 80° C. to thereby form an electrolyte membrane. Finally, the electrolyte membrane was put in a hot air drier set at 190° C. for 20 min to carry out a heat treatment to thereby obtain an electrolyte membrane. That is, the annealing temperature of Comparative Example 2 was 190° C.

Comparative Example 3

An electrolyte membrane was obtained as in Example 2, except for making the annealing temperature to be 190° C.

Comparative Example 4

An electrolyte membrane was obtained as in Example 2, except for making the annealing temperature to be 210° C.

TABLE 1

|  | Example 1 | Example 2 | Example 3 | Comparative Example 1 | Comparative Example 2 | Comparative Example 3 | Comparative Example 4 |
|---|---|---|---|---|---|---|---|
| EW | 820 | 790 | 600 | 1060 | 740 | 780 | 785 |
| Cluster Diameter (nm) | 3.1 | 3.04 | 3.18 | 2.96 | 2.92 | 2.98 | 2.96 |
| Ion Conductivity (S/cm) | 0.12 | 0.13 | 0.17 | 0.09 | 0.14 | 0.13 | 0.12 |
| Annealing Temperature (° C.) | 215 | 220 | 220 | 190 | 190 | 190 | 210 |
| Converted puncture strength (gf/50 μm) | 370 | 340 | 305 | 290 | 170 | 280 | 295 |

The present application claims the priority based on Japanese Patent Application No. 2016-175772, filed on Sep. 8, 2016, the contents of which are hereby incorporated by reference.

INDUSTRIAL APPLICABILITY

The polymer electrolyte membrane according to the present invention can preferably be used, as an electrolyte membrane low in electric resistance and high in mechanical strength, for polymer electrolyte fuel cell, redox flow battery, water electrolysis, soda electrolysis, and the like.

The invention claimed is:

1. A polymer electrolyte membrane, having an ion cluster diameter of 3.02 nm to 3.17 nm and a converted puncture strength of 300 gf/50 μm or more, comprising:
a mixture of two or more fluorine-based electrolyte polymers, each of which has an ion-exchange group and has a monomer structure different from each other, wherein the fluorine-based electrolyte polymers are PFSA resins having structures represented by the following formula (5); and
the PFSA resins are obtained by hydrolyzing a PFSA resin precursor composed of a copolymer of a fluorinated vinyl ether compound represented by the following formula (6) with a fluoroolefin monomer represented by the following formula (8), $$-[CF_2CF_2]_a-[CF_2-CF(-O-(CF_2)_m-SO_3H)]_g- \quad (5)$$

wherein $0 \le a \le 1$, $0 < g \le 1$, and $a+g=1$; and m is an integer of 1 to 6, $$CF_2=CF-O-(CF_2CFXO)_n-A \quad (6)$$

wherein X is F or a perfluoroalkyl group having 1 to 3 carbon atoms; n is an integer of 0 to 5; and A is $(CF_2)_m$-W, wherein m is an integer of 0 to 6, n and m are not 0 at the same time, and W is a functional group convertible to $SO_3H$ by hydrolysis, $$CF2=CFZ \quad (8)$$

wherein Z is H, Cl, F, a perfluoroalkyl group having 1 to 3 carbon atoms, or a cyclic perfluoroalkyl group which may contain oxygen, and wherein the polymer electrolyte membrane has an equivalent weight, EW, of 700 to 950 (g/eq); wherein the ion cluster diameter is measured after immersion for 24 hours in water at 25° C. by small angle X-ray scattering.

2. The polymer electrolyte membrane according to claim 1, having an ion conductivity of 0.10 S/cm or more.

3. A method for producing the polymer electrolyte membrane of claim 1, comprising:
a) mixing two or more fluorine-based electrolyte polymers, each of which has an ion-exchange group and has a monomer structure different from each other, wherein the fluorine-based electrolyte polymers are PFSA resins having structures represented by the following formula (5); and
the PFSA resins are obtained by hydrolyzing a PFSA resin precursor composed of a copolymer of a fluorinated vinyl ether compound represented by the following formula (6) with a fluoroolefin monomer represented by the following formula (8), $$-[CF_2CF_2]_a-[CF_2-CF(-O-(CF_2)_m-SO_3H)]_g- \quad (5)$$

wherein $0 \le a \le 1$, $0 < g \le 1$, and $a+g=1$; and m is an integer of 1 to 6, $$CF_2=CF-O-(CF_2CFXO)_n-A \quad (6)$$

wherein X is F or a perfluoroalkyl group having 1 to 3 carbon atoms; n is an integer of 0 to 5; and A is $(CF_2)_m$-W, wherein m is an integer of 0 to 6, n and m are not 0 at the same time, and W is a functional group convertible to $SO_3H$ by hydrolysis, $$CF2=CFZ \quad (8)$$

wherein Z is H, Cl, F, a perfluoroalkyl group having 1 to 3 carbon atoms, or a cyclic perfluoroalkyl group which may contain oxygen, and
wherein the polymer electrolyte membrane has an equivalent weight, EW, of 700 to 950 (g/eq);
b) casting the polymer electrolyte membrane from a suspension or a solution of the mixed fluorine-based electrolyte polymers; and
c) subjecting the cast polymer electrolyte membrane to a heat treatment at a temperature of more than 210° C.

4. The method for producing the polymer electrolyte membrane according to claim 3, wherein the temperature of the heat treatment is 215° C. or more.

5. A redox flow secondary battery, comprising the polymer electrolyte membrane according to claim 1.

6. A water electrolysis facility, comprising the polymer electrolyte membrane according to claim 1.

7. A membrane electrode assembly, comprising the polymer electrolyte membrane according to claim 1.

8. A fuel cell, comprising the membrane electrode assembly according to claim 7.

* * * * *

UNITED STATES PATENT AND TRADEMARK OFFICE
CERTIFICATE OF CORRECTION

| | |
|---|---|
| PATENT NO. | : 11,539,064 B2 |
| APPLICATION NO. | : 16/330633 |
| DATED | : December 27, 2022 |
| INVENTOR(S) | : Y. Inoue et al. |

It is certified that error appears in the above-identified patent and that said Letters Patent is hereby corrected as shown below:

On the Title Page

Item (56) Publications, Column 2, Line 6, please change "Nation" to -- Nafion --

In the Claims

Column 19, Line 46 (Claim 1, Line 16) please change "0 a" to -- $0 \leqslant a$ --
Column 20, Line 33 (Claim 3, Line 15) please change "0 a" to -- $0 \leqslant a$ --

Signed and Sealed this
Sixteenth Day of May, 2023

Katherine Kelly Vidal
*Director of the United States Patent and Trademark Office*